United States Patent
Mavrosakis

(10) Patent No.: US 7,104,693 B2
(45) Date of Patent: Sep. 12, 2006

(54) MULTI-THICKNESS FILM LAYER BEARING CARTRIDGE AND HOUSING

(75) Inventor: Peter Mavrosakis, Lomita, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/879,243

(22) Filed: Jun. 28, 2004

(65) Prior Publication Data

US 2005/0286819 A1   Dec. 29, 2005

(51) Int. Cl.
*F16C 19/08*   (2006.01)

(52) U.S. Cl. ....................................... 384/99
(58) Field of Classification Search .............. 384/99, 384/490, 537
See application file for complete search history.

(56) References Cited

U.S. PATENT DOCUMENTS

| | | | |
|---|---|---|---|
| 3,456,992 A | 7/1969 | Kulina | |
| 4,527,912 A | 7/1985 | Klusman | |
| 4,721,441 A | 1/1988 | Miyashita et al. | |
| 4,943,170 A | 7/1990 | Aida | |
| 4,983,050 A | 1/1991 | Aida | |
| 4,997,290 A | 3/1991 | Aida | |
| 5,028,150 A | 7/1991 | Kronenberger et al. | |
| 5,071,262 A * | 12/1991 | Monzel et al. | 384/99 |
| 5,145,334 A | 9/1992 | Gutknecht | |
| 2002/0136473 A1 | 9/2002 | Mollmann | |

FOREIGN PATENT DOCUMENTS

| | | |
|---|---|---|
| EP | 0 504 138 B1 | 9/1994 |
| GB | 2107002 | 4/1983 |
| JP | 049078048 | 7/1974 |
| JP | 2001303964 | 10/2001 |
| WO | WO 01/69046 | 9/2001 |

* cited by examiner

*Primary Examiner*—Lenard A. Footland
(74) *Attorney, Agent, or Firm*—Chris James; Brian Pangile

(57) ABSTRACT

An exemplary squeeze film bearing cartridge for a turbocharger includes a center section, two outer sections having a first outer diameter and two intermediate sections having a second outer diameter, the intermediate sections positioned intermediate the center section and a respective one of the outer sections and wherein the first outer diameter exceeds the second outer diameter. Various exemplary bearing cartridges, housings, assemblies, etc., are also disclosed.

7 Claims, 5 Drawing Sheets

MULTI-THICKNESS FILM LAYER BEARING CARTRIDGE AND HOUSING

TECHNICAL FIELD

Subject matter disclosed herein relates generally to turbomachinery for internal combustion engines and, in particular, rolling element bearing cartridges and bearing housings for such bearing cartridges.

BACKGROUND

The advantages associated with low friction bearings are well known to a multitude of varied industries. High-speed applications with DN (dynamic number) values over 1,000,000 are common place for turbomachinery. These high-speed applications, owing to the fact that rotor imbalance force increases as a square function of rotor speed, require damping. Without damping, transmitted forces through the system would cause many well-known problems such as noise, fretting, loosening of joints, and overall reduced service life. Further, the bearings themselves would have unacceptable life. For these reasons, turbomachinery bearings are not hard mounted within their housings. The skilled rotordynamics design engineer spends the majority of his/her life managing these forces, especially those forces encountered as the rotor goes through its natural frequencies, commonly referred to as "critical speeds".

Most turbochargers that employ a low friction rolling element bearing use two angular contact ball bearings, with each accepting the thrust load in a given axial direction, that are joined together in what is commonly referred to as a "cartridge". In a cylindrical coordinate system a bearing may be defined with respect to axial, radial and azimuthal dimensions. Within a bearing housing, referred to as housing in subsequent text, a cartridge is located axially and azimuthally via one or more mechanisms.

For proper functioning, some movement can occur in a radial direction along a radial line typically defined by an azimuthal locating mechanism. The housing usually allows lubricant to flow to an outer surface of the bearing cartridge whereby lubricant can enter the bearing cartridge. Lubricant can also form a film between the housing and the outer surface of the bearing cartridge, which is often referred to as a "squeeze film". A clearance between the housing and a portion of the bearing cartridge outer surface typically defines a film thickness. From machine to machine, the film thickness varies in thickness and length depending on many design factors such as the viscosity of the lubricant, the specific rotor size and associated imbalance forces, as well as space envelope constraints.

While operational conditions may cause some slight variations in film thickness (e.g., due to radial movement, etc.), the optimal film thickness is usually a design parameter specified by an outer diameter of the bearing cartridge and an inner diameter of the housing. If the clearance is too small, the squeeze film is overly stiff allowing unacceptable rotor imbalance forces to be transmitted from the bearing cartridge to the housing and surrounding system. On the other hand, if the clearance is too large, then the rotor and bearing cartridge has excessive radial freedom from the center axis of the housing. This excessive radial freedom in turn forces excessive clearances necessary to avoid contacts (rubs) between the rotating turbine and compressor wheels and their respective, stationary housings. These wheel to housing clearances are very undesirable as they cause turbulent, secondary air flows which show up as reduced thermodynamic efficiency of the compressor and turbine stages. Thus, the design engineer is forced into a compromise between desired optimal squeeze film damping and unwanted excessive rotor radial freedom.

Overall, an industry need exists for rolling element bearings and/or housings that utilize a squeeze film damper to be optimized for both damping and rotor radial freedom. Various exemplary bearing cartridges and housings presented herein address such issues and optionally other issues.

BRIEF DESCRIPTION OF THE DRAWINGS

A more complete understanding of the various methods, devices, systems, arrangements, etc., described herein, and equivalents thereof, may be had by reference to the following detailed description when taken in conjunction with the accompanying drawings wherein.

DETAILED DESCRIPTION

Various exemplary methods, devices, systems, arrangements, etc., disclosed herein address issues related to technology associated with turbochargers and are optionally suitable for use with electrically assisted turbochargers.

Figure 1A:
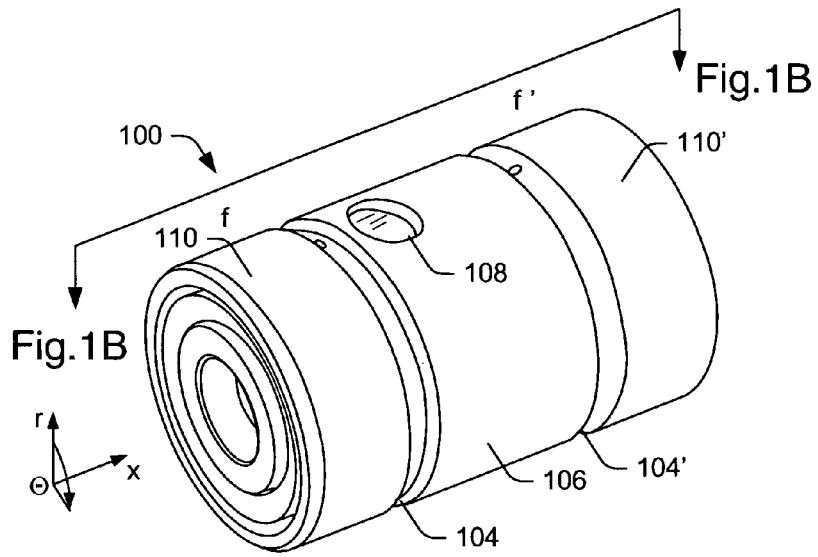
FIG. 1A is a perspective view diagram of a prior art bearing cartridge for a turbocharger.

FIG. 1A shows a perspective view of prior art bearing cartridge 100. A cylindrical coordinate system is shown for reference that includes radial (r), axial (x) and azimuthal (Θ) dimensions. The cartridge 100 includes two annular wells 104, 104' positioned intermediate a center section 106 and respective ends of the cartridge 100. The center section 106 of the cartridge 100 includes an opening 108 that cooperates with a pin to position the cartridge 100 axially and azimuthally in a housing or journal. The wells 104, 104' are positioned adjacent to outer sections 110, 110', respectively. The outer sections 110, 110' have equal outer diameters that define a clearance with a housing and thereby allow for formation of lubricant films f, f'.

Figure 1B:
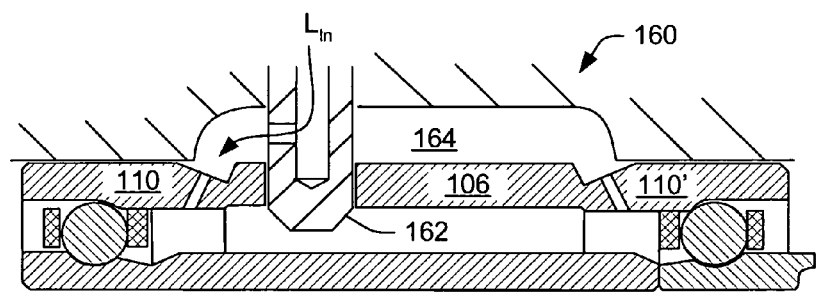
FIG. 1B is a diagram of a prior art bearing cartridge in a prior art housing.
Figure 1B:
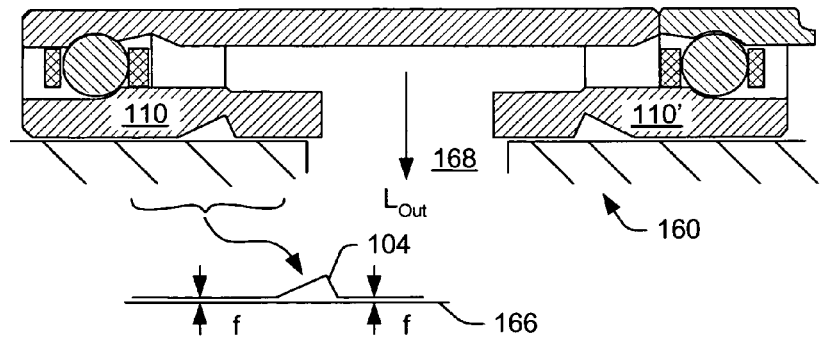

FIG. 1B shows a cross-sectional view of the prior art cartridge 100 in a prior art housing 160. A pin 162 acts to locate the cartridge 100 axially and azimuthally while allowing freedom in the radial direction. Lubricant can flow via a conduit in the pin 162 to a lubricant entrance well 164 adjacent the center section 106 of the cartridge 100. A lubricant exit well 168 exists nearly opposite the entrance well 164 that allows for drainage of lubricant in and about the cartridge 100.

As shown in FIG. 1B, a clearance exists between an outer diameter of the outer sections 110, 110' and an inner diameter of the housing 160. In this prior art assembly, the clearance defines a single film thickness f. An enlargement of the cross-section shows the single film thickness f as it exists on either side of the well 104. As mentioned in the Background section, the selection of this clearance (squeeze film thickness) acts to determine the operational characteristics such as rotor radial freedom and damping of rotor imbalance forces.

Figure 2:
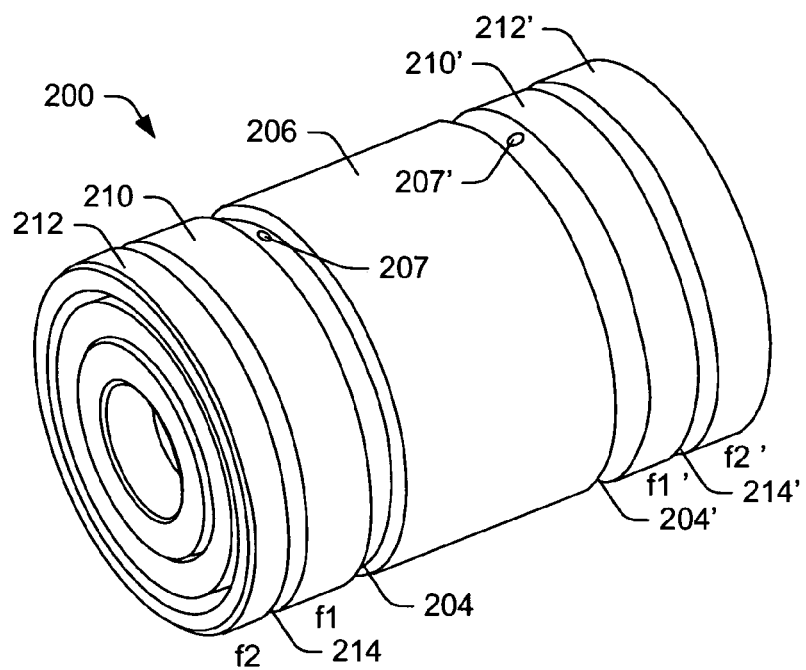
FIG. 2 is a perspective view diagram of an exemplary bearing cartridge that includes two regions with different outer diameters to thereby allow for formation of, for example, two film regions in conjunction with a housing.

FIG. 2 shows a perspective view on an exemplary bearing cartridge 200 that allows for multiple film thicknesses. The cartridge 200 includes two annular wells 204, 204' and two grind reliefs 214, 214' positioned intermediate a center section 206 and respective ends of the cartridge 200. The center section 206 of the cartridge 200 may include one or more lubricant openings, for example, as shown in FIG. 1A and FIG. 1B. The cartridge 200 may include one or more alternative openings, one or more of which cooperate with a pin or other feature to position the cartridge 200 axially and optionally azimuthally in a housing or journal. In this example, the cartridge 200 includes openings 207 and 207' that allow jet lubrication to enter and be directed at the balls of the cartridge 200. Additional openings are optionally included for lubricant flow.

The wells 204, 204' are positioned adjacent to intermediate sections 210, 210', respectively. The intermediate sections 210, 210' have outer diameters that can define clearances with a housing and thereby allow for formation of lubricant films f1, f1', which may be substantially equal. The grind reliefs 214, 214' are positioned adjacent to outer sections 212, 212', respectively. The outer sections 212, 212' have outer diameters that define clearances with a housing and thereby allow for formation of lubricant films f2, f2', which may be substantially equal.

Accordingly, the exemplary cartridge 200 may include multiple film thicknesses by selection of outer diameters of the sections 210, 210', 212, 212'. A housing optionally has an inner diameter that acts to define clearances with these outer diameters. As described further below, an exemplary housing includes more than one inner diameter for defining clearances and film thicknesses that act to reduce rotor radial freedom or dampen vibrations.

Figure 3:
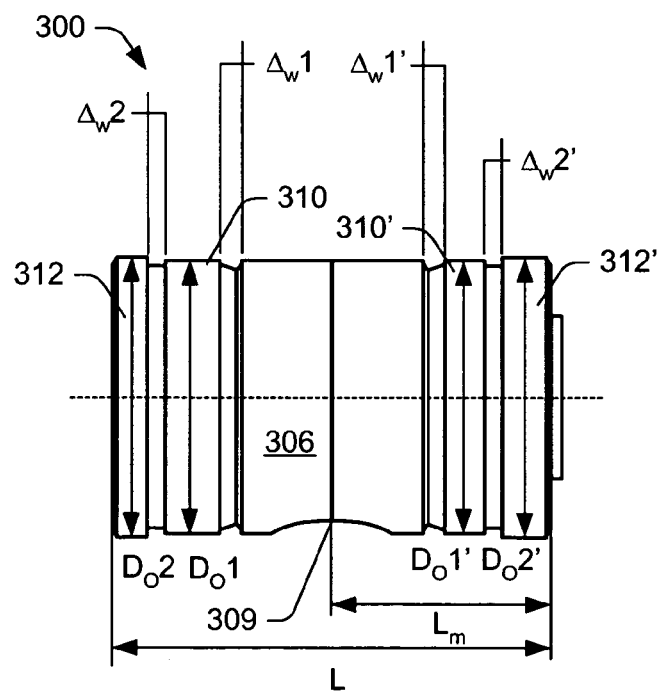
FIG. 3 is a side view of an exemplary bearing cartridge that includes two regions with different outer diameters to thereby allow for formation of, for example, two film regions in conjunction with a housing.

FIG. 3 shows a side view of an exemplary cartridge 300 such as the cartridge 200 of FIG. 2. The cartridge 300 has an approximate length L, an approximate axial midpoint $L_m$ and includes intermediate sections 310, 310' having outer diameters $D_o1$, $D_o1'$ and outer sections 312, 312' having outer diameters $D_o2$, $D_o2'$. In this example, a drain or lubricant opening 309 is positioned at an axial position at or proximate to the midpoint $L_m$. The cartridge 300 may include openings such as 207, 207' of the cartridge 200 of FIG. 2.

The cartridge 300 includes various wells and/or grind reliefs wherein wells of axial width $\Delta_w1$, $\Delta_w1'$ exist between a center section 306 and intermediate sections 310, 310' with outer diameters $D_o1$ and $D_o1'$ and grind reliefs of axial width $\Delta_w2$, $\Delta_w2'$ exist between respective intermediate sections 310, 310' with outer diameters $D_o1$ and $D_o1'$ and outer sections 312, 312' with outer diameters $D_o2$, $D_o2'$. The well widths $\Delta_w1$, $\Delta_w1'$ may be substantially equal and the grind relief widths $\Delta_w2$, $\neq_w2'$ may be substantially equal.

The various outer and intermediate sections 310, 310', 312, 312' may differ in axial width. For example, the cartridge 300 includes an outer section 312 with outer diameter $D_o2$ that has an axial width less than the outer section 312' with outer diameter $D_o2'$. In addition, the intermediate section 310 with outer diameter $D_o1$ has an axial width less than the intermediate section 310' with outer diameter $D_o1'$.

The exemplary cartridge 300 includes various parameters that may be used to achieve desired performance characteristics. For example, the axial width and outer diameters of the various sections may be used to define radial clearances/film thicknesses and axial film length(s). In general, judicious selection of thickness, length and number of squeeze films can act to achieve suitable reduction in radial freedom and optimized damping of rotor imbalance forces. For example, the exemplary cartridge 300 includes outer sections 312, 312' with outer diameters $D_o2$, $D_o2'$ wherein $D_o2$, $D_o2'$ exceed the outer diameters $D_o1$, $D_o1'$ of the intermediate sections 310, 310'. Thus, given a housing with a specified inner diameter $D_1$, the bearing cartridge 300 would form thin and thick films, for example, wherein the thin films act to reduce rotor radial freedom and the thick films act to dampen rotor imbalance forces.

Figure 4:
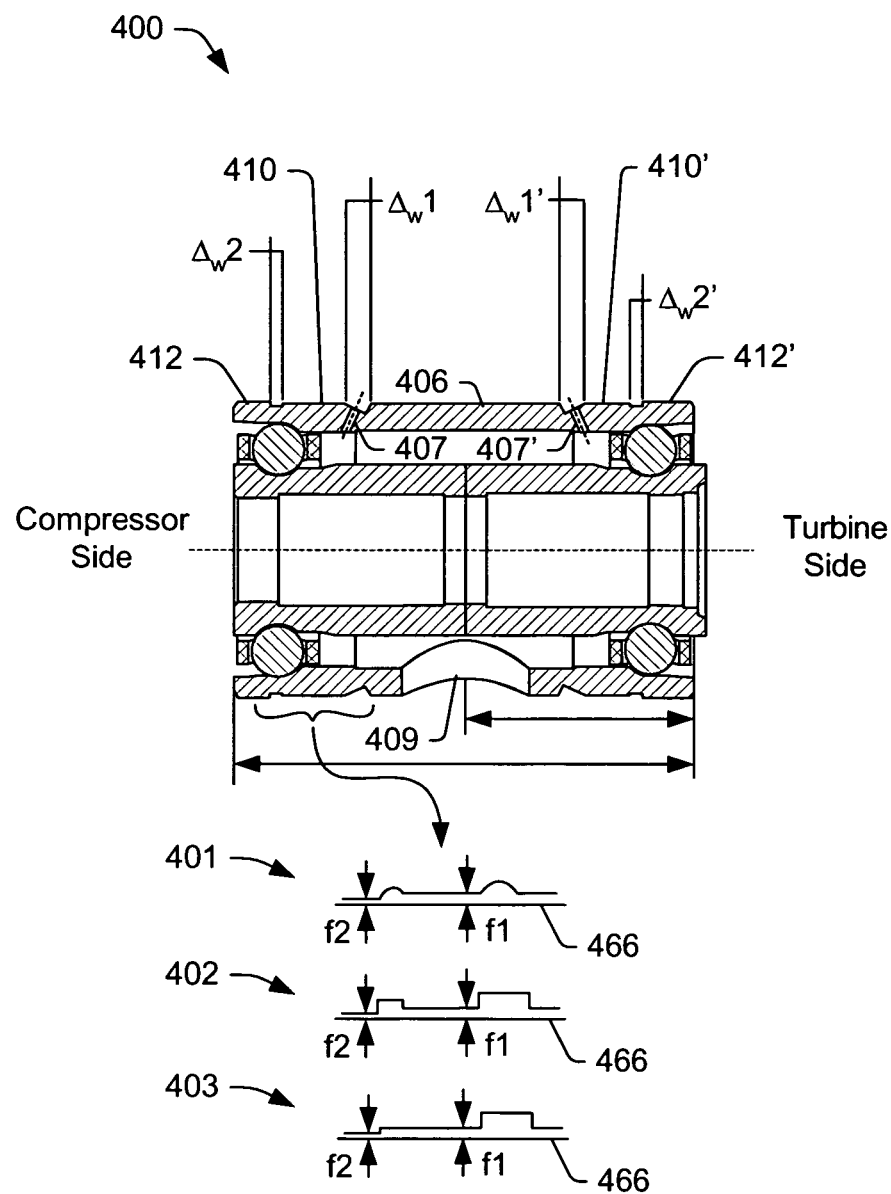
FIG. 4 is a cross-sectional view of an exemplary bearing cartridge that includes two regions with different outer diameters to thereby allow for formation of, for example, two film regions in conjunction with a housing.

FIG. 4 shows a cross-sectional diagram of an exemplary bearing cartridge 400. The cartridge 400 includes a center section 406, intermediate sections 410, 410' and outer sections 412, 412'. The bearing also includes lubricant passages 407, 407' and 409.

An enlargement shows various wells (e.g., wells, grind reliefs, etc.) and/or transitions from a first outer diameter to a second outer diameter. A wall 466 of a housing or journal having an inner diameter acts to define clearances and film thicknesses f1, f2. In a first scenario 401, wells have curvilinear cross-section; in a second scenario 402, wells have substantially polygonal cross-section; and in a third scenario 403, a step in outer diameter exists between a thick film region f1 and a thinner film region f2. The scenarios 401, 402, 403 are exemplary as others may be used to create clearances that form multiple film thicknesses.

Figure 5:
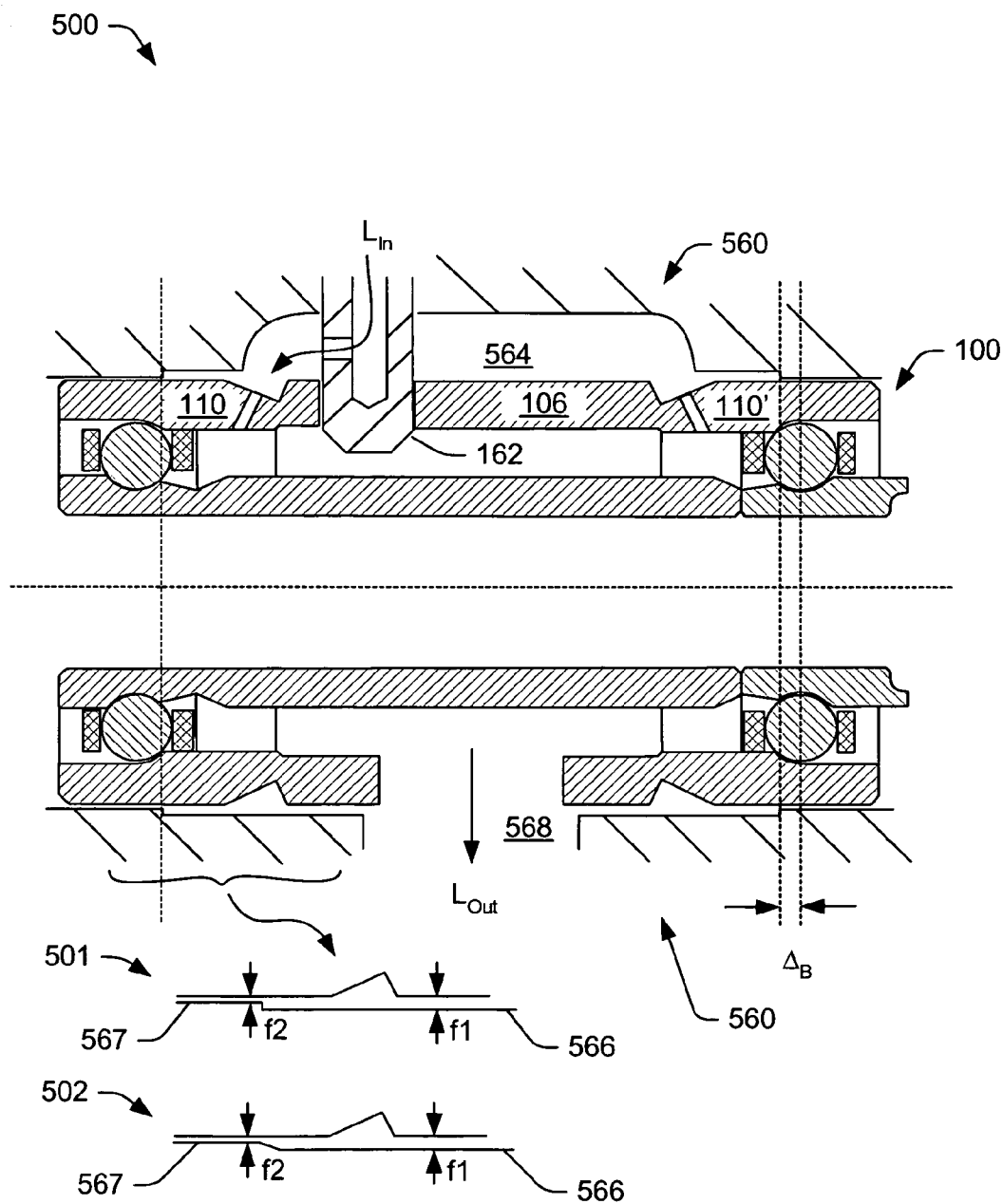
FIG. 5 is a cross-sectional view of a bearing cartridge in an exemplary housing that includes two regions with different inner diameters to thereby allow for formation of, for example, two film regions.

As already mentioned, a housing or journal may act to define clearances that form multiple film thicknesses between the housing and one or more outer diameters of a bearing cartridge. FIG. 5 shows an exemplary assembly 500 that includes an exemplary housing 560. The exemplary assembly 500 includes a bearing cartridge 100 such as the bearing cartridge 100 of FIGS. 1A and 1B.

The exemplary housing 560 includes two or more inner diameters that act to define more than one clearance with the bearing cartridge 100. An enlargement shows two exemplary scenarios 501, 502. In these two scenarios, a first inner surface 566 of the housing 560 has a first inner diameter and a second inner surface 567 of the housing 560 has a second inner diameter. In conjunction with the bearing cartridge 100, the first inner surface 566 acts to form a film thickness f1 and the second inner surface 567 acts to form a film thickness f2. In the scenario 501, the transition between the first surface 566 and the second surface 567 is a step whereas in the scenario 502, the transition between the first surface 566 and the second surface 567 is a gradient, definable by one or more derivatives with respect to an axial dimension, optionally including a step.

Figure 6A:
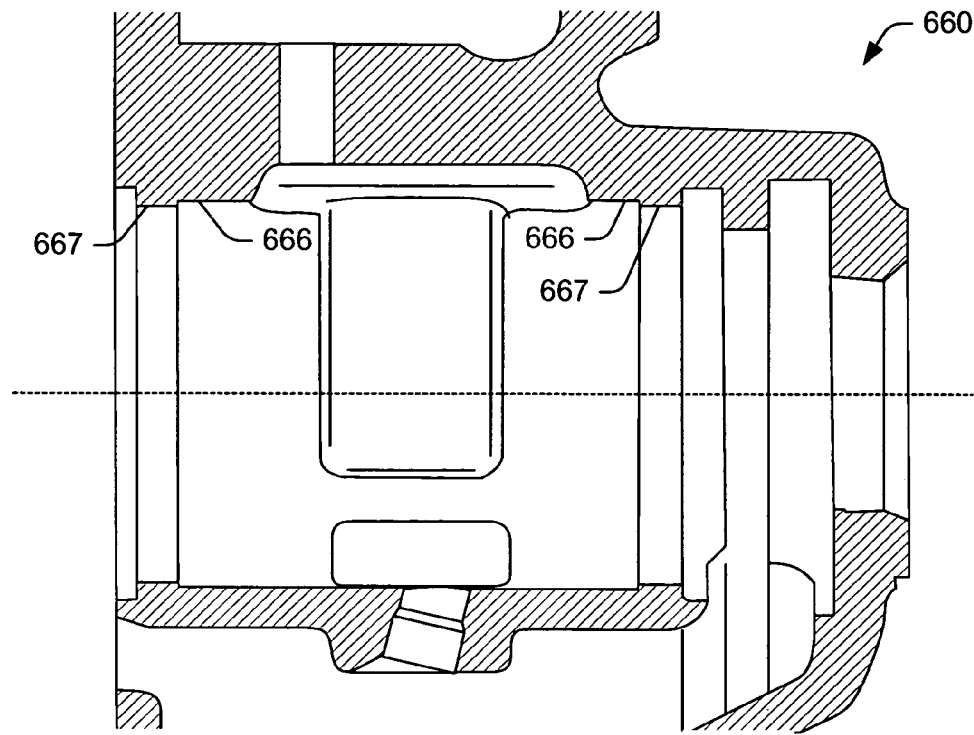
FIG. 6A is a cross-sectional side view of an exemplary housing that includes two regions with different inner diameters to thereby allow for formation of, for example, two film regions in conjunction with a bearing cartridge.
Figure 6B:
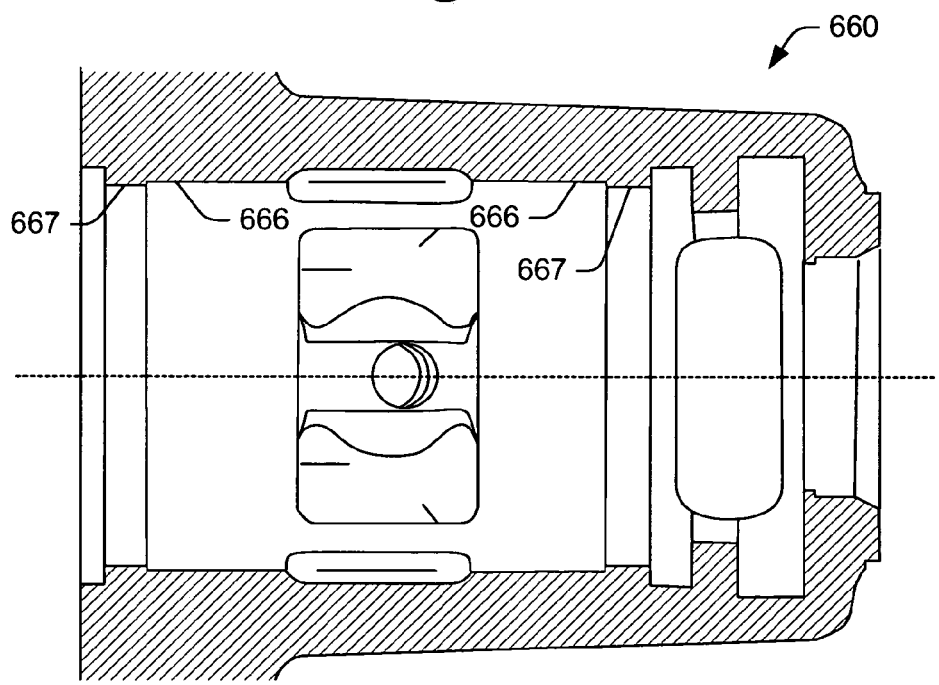
FIG. 6B is a cross-sectional top view of an exemplary housing that includes two regions with different inner diameters to thereby allow for formation of, for example, two film regions in conjunction with a bearing cartridge.

FIG. 6A shows a cross-sectional, side view of an exemplary housing 660 and FIG. 6B shows a cross-sectional top view of the exemplary bearing housing 660. The exemplary housing 560 can house a bearing cartridge and act to define clearances between an outer surface of the bearing cartridge and an inner wall of the housing 660 wherein the clearances act to form various films that can be aimed at reduction of unwanted excessive radial clearance and/or optimized dampening of rotor imbalance forces.

An inner surface 666 has a first inner diameter and an inner surface 667 has a second inner diameter wherein the first inner diameter exceeds the second inner diameter. A bearing cartridge that includes an outer surface having an outer diameter may act to define clearances with the first and second inner surfaces 666, 667 when positioned in the housing to form an assembly.

Various exemplary devices, methods, systems, arrangements, etc., described herein pertain to formation and use of multiple film thicknesses. In various examples, one film has damping characteristics and another film has characteristics that minimize excessive radial freedom and play.

An exemplary bearing cartridge includes an inner film to outer film ratio of approximately 1:2, i.e., the inner film being approximately twice the thickness of the outer film. For example, an inner film of approximately 0.0030 inch (approx. 0.076 mm) and an outer film of approximately 0.0015 inch (approx. 0.0038 mm) wherein the inner film acts to dampen vibrations and the outer film acts to limit rotor radial play. Such an exemplary bearing cartridge may be suitable for use in a commercially available GARRETT® GTA47-55R turbomachinery device (Torrance, Calif.).

In general, a sufficiently thick film can act to reduce noise and vibration and loading through the system; whereas a thinner film can reduce slop or play in the system (e.g., rotor play, etc.). A thinner film may also allow for reduction in wheel to housing clearances in a turbocharger system, which can act to reduce undesirable secondary aerodynamic flows that would cause reduced compressor and turbine stage thermodynamic efficiencies.

Various examples include one or more thinner clearance regions proximate to an outer end(s) of a bearing cartridge. A pair of thinner clearance regions proximate to outer ends of a bearing cartridge may limit pivot when compared to a thinner clearance region(s) positioned proximate to or at a center section.

Although some exemplary methods, devices, systems arrangements, etc., have been illustrated in the accompanying Drawings and described in the foregoing Detailed Description, it will be understood that the exemplary embodiments disclosed are not limiting, but are capable of numerous rearrangements, modifications and substitutions without departing from the spirit set forth and defined by the following claims.

What is claimed is:

1. A squeeze film bearing cartridge for a turbocharger comprising:
   a center section;
   two outer sections having a first outer diameter;
   two intermediate sections having a second outer diameter, the intermediate sections positioned intermediate the center section and a respective one of the outer sections and wherein the first outer diameter exceeds the second outer diameter; and
   a first well intermediate the center section and one of the intermediate sections and a second well intermediate the center section and the other of the intermediate sections wherein the wells include one or more openings to allow lubricant to enter the bearing cartridge.

2. A squeeze film bearing cartridge for a turbocharger comprising:
   a center section;
   two outer sections having a first outer diameter;
   two intermediate sections having a second outer diameter, the intermediate sections positioned intermediate the center section and a respective one of the outer sections and wherein the first outer diameter exceeds the second outer diameter;
   a first well intermediate the center section and one of the intermediate sections and a second well intermediate the center section and the other of the intermediate sections; and
   a first grind relief intermediate one of the intermediate sections and one of the outer sections and a second grind relief intermediate the other of the intermediate sections and the other of the outer sections.

3. The bearing cartridge of claim 2 wherein the first grind relief and the second grind relief comprise curvilinear cross-sections.

4. The bearing cartridge of claim 2 wherein the first grind relief and the second grind relief comprise polygonal cross-sections.

5. A squeeze film bearing cartridge for a turbocharger comprising:
   a center section;
   two outer sections having a first outer diameter;
   two intermediate sections having a second outer diameter, the intermediate sections positioned intermediate the center section and a respective one of the outer sections and wherein the first outer diameter exceeds the second outer diameter;
   a well positioned between the center section and one of the intermediate sections and another well positioned between the center section and the other of the intermediate sections; and
   a first step intermediate one of the intermediate sections and one of the outer sections and a second step intermediate the other of the intermediate sections and the other of the outer sections.

6. A squeeze film bearing cartridge for a turbocharger comprising:
   a center section;
   two outer sections having a first outer diameter;
   two intermediate sections having a second outer diameter, the intermediate sections positioned intermediate the center section and a respective one of the outer sections and wherein the first outer diameter exceeds the second outer diameter;
   a well positioned between the center section and one of the intermediate sections and another well positioned between the center section and the other of the intermediate sections; and
   an opening to axially locate the cartridge in a housing wherein the opening comprises a lubricant exit.

7. The bearing cartridge of claim 6 wherein the wells include one or more openings to allow lubricant to enter the bearing cartridge.

* * * * *